Jan. 30, 1940.                F. D. FRISBY                2,188,403
           VARIABLE SPEED TRANSMISSION MECHANISM FOR AUTOMOBILES AND THE LIKE
                        Filed Oct. 24, 1936           4 Sheets-Sheet 1
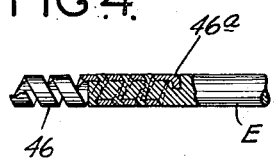
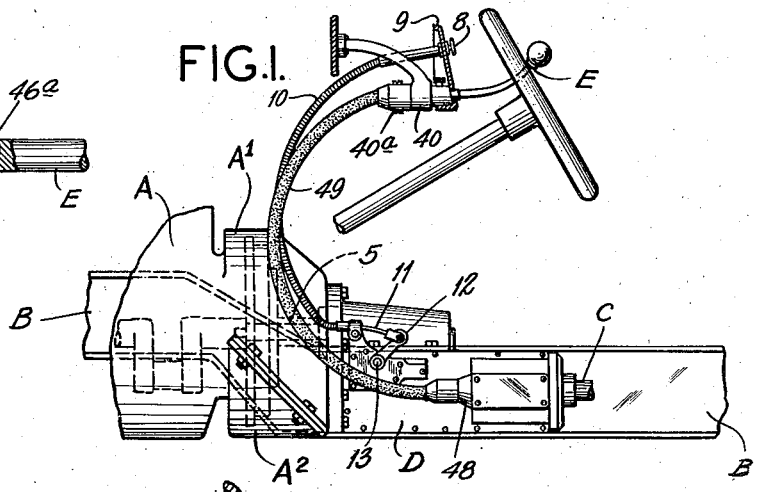
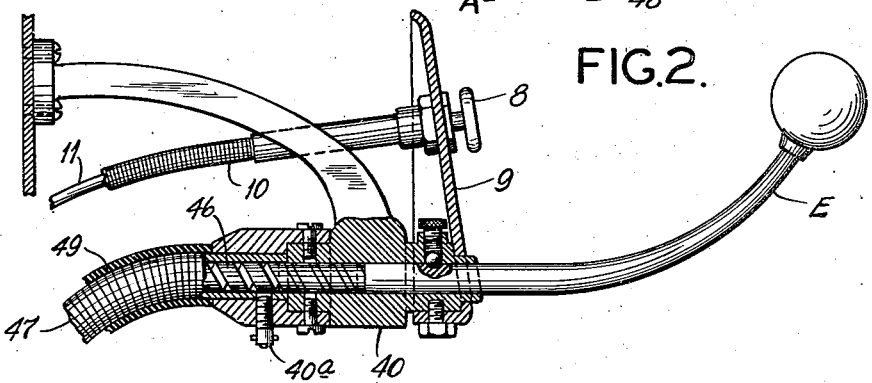
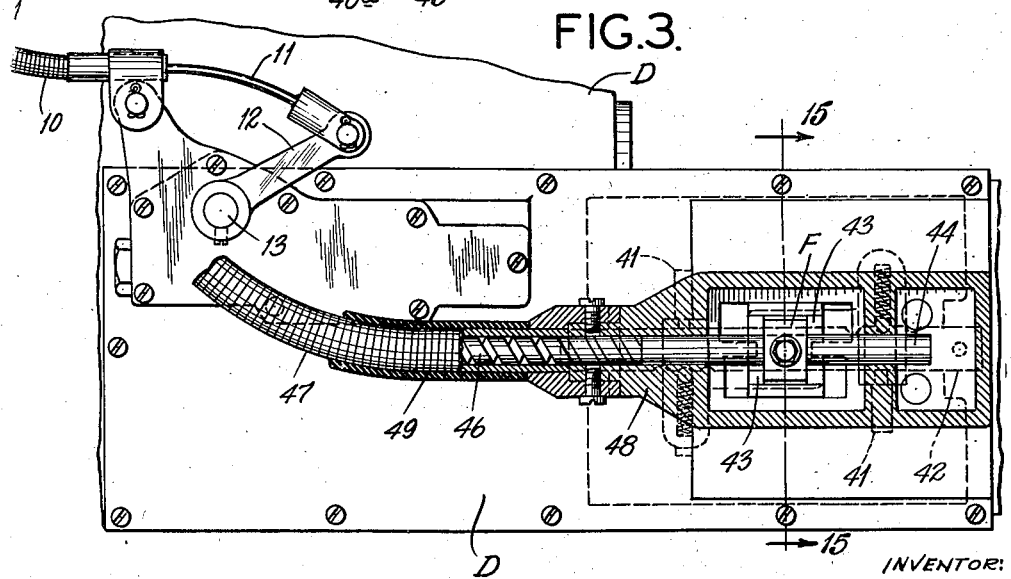
INVENTOR:
FRANK D. FRISBY,
By Wells L. Church
ATTORNEY.

Jan. 30, 1940.  F. D. FRISBY  2,188,403
VARIABLE SPEED TRANSMISSION MECHANISM FOR AUTOMOBILES AND THE LIKE
Filed Oct. 24, 1936  4 Sheets-Sheet 2

INVENTOR:
FRANK D. FRISBY,
BY Nells L. Church
ATTORNEY.

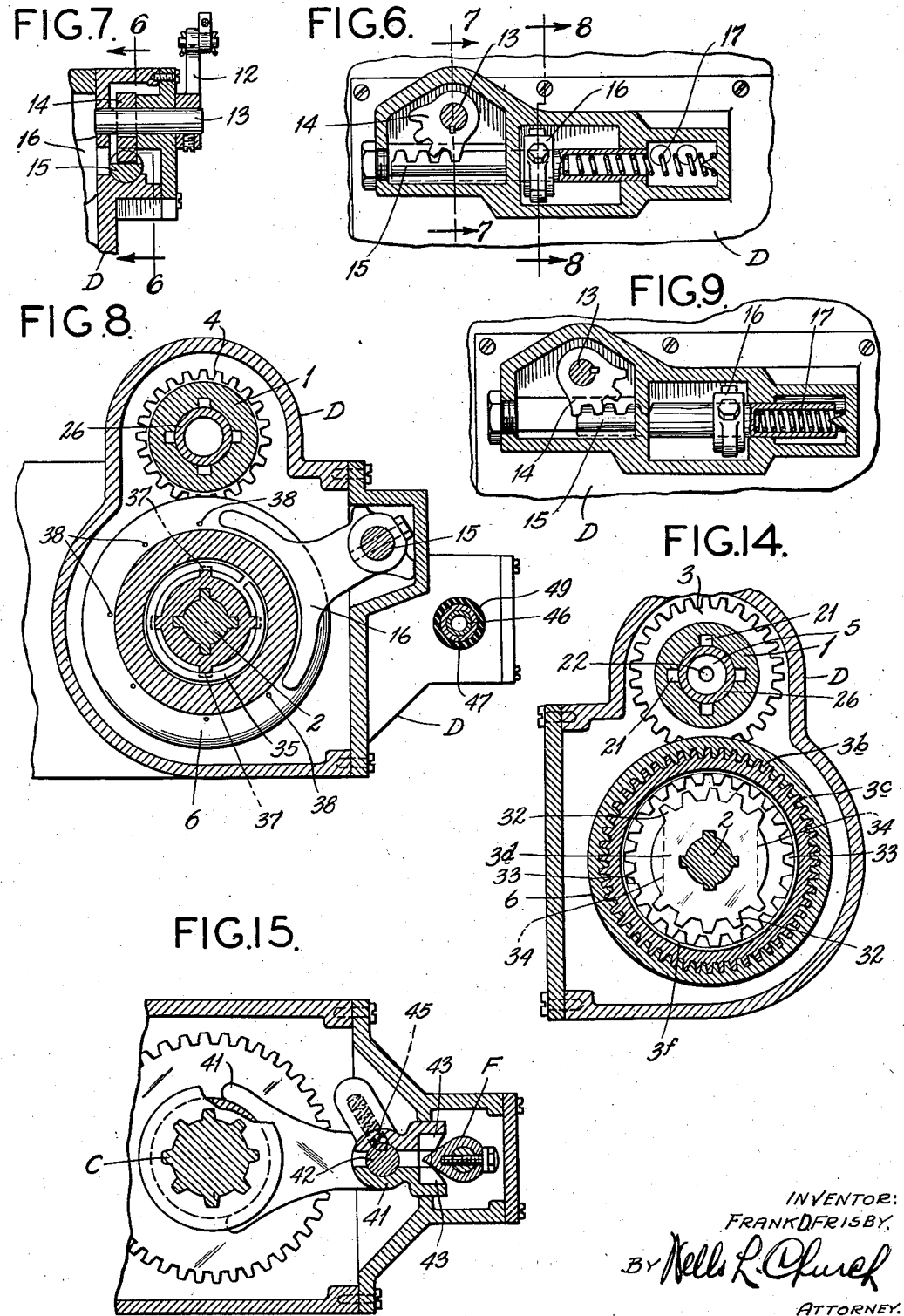

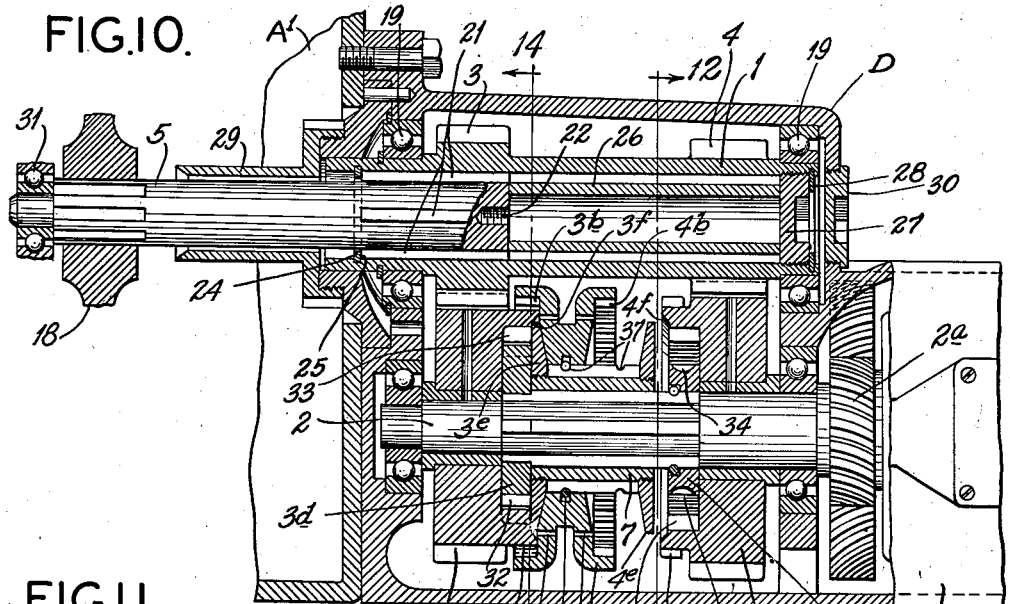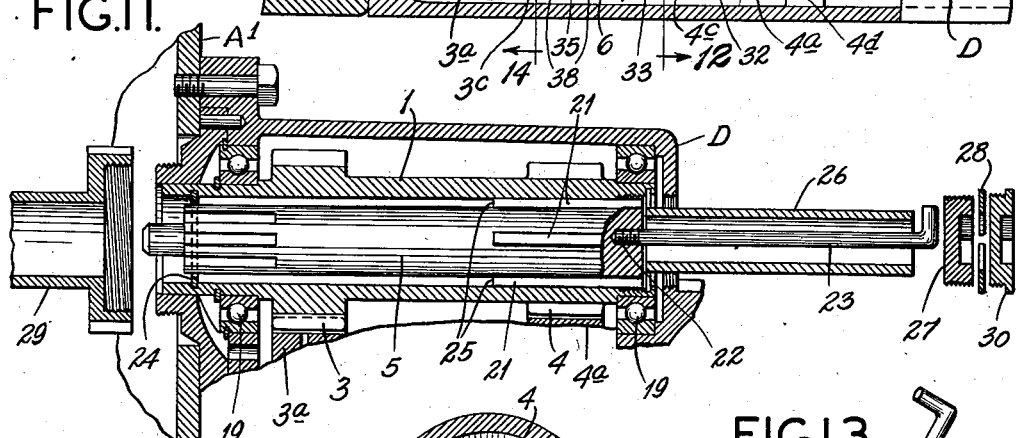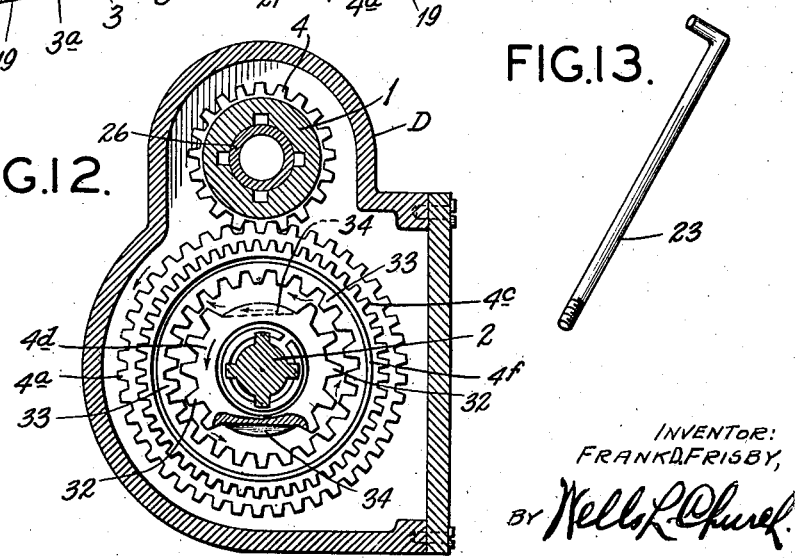

Patented Jan. 30, 1940

2,188,403

UNITED STATES PATENT OFFICE 2,188,403

VARIABLE SPEED TRANSMISSION MECHANISM FOR AUTOMOBILES AND THE LIKE

Frank D. Frisby, St. Louis, Mo.

Application October 24, 1936, Serial No. 107,308

2 Claims. (Cl. 74—370)

This invention relates to variable speed transmission mechanisms of the general type that are now used on power operated vehicles and conveyances for transmitting movement from an internal combustion engine, or other power unit, to a propeller shaft or equivalent device.

One object of my invention is to provide an efficient means, of simple design and novel construction, for enlarging or increasing the speed range of transmission mechanisms of the type that comprise gears which are adapted to be arranged in different relationships, or moved into and out of engagement with each other, so as to vary the speed of the propeller shaft or other driven element of the apparatus.

Another object is to provide a mechanism that can be built into, or used as, an attachment for transmission mechanisms of the type now in general use, on automobiles, trucks, and the like, so as to produce a variable speed transmission mechanism of novel design that has six forward speeds and two reverse speeds.

Another object is to provide an inexpensive and efficient dual drive for automobiles, and similar vehicles and conveyances, which is of such design or construction, that one set of gears may have a 2 to 1 ratio for a normal drive, and the other set of gears may have either a 1.40 to 1 ratio for a higher, economy drive, or a 2.60 to 1 ratio for a lower, power drive, which would be of particular value in instances where an automobile is used for pulling a trailer over mountain roads or poor roads.

Another object is to provide a novel transmission mechanism for automobiles and the like that is particularly adapted for use with a low hypoid drive, and which is of such construction that it makes it commercially practicable or feasible to design an automobile having the following desirable characteristics, namely, (a) a low hung body whose floor is substantially flat and level and not marred by a propeller shaft tunnel, or even by a gear shifting lever that projects upwardly from the floor near the driver's seat; (b) a fly wheel housing that does not project downwardly below the side members of the chassis frame; and (c) a transmission case whose major portion lies within the depth of the chassis frame with no portion of said case projecting downwardly below the chassis frame.

Another object is to provide a transmission mechanism for automobiles and the like equipped with a dropped or low hung propeller shaft, which is constructed in a novel manner which permits the friction elements of the clutch, and, if desired, the fly wheel, to be quickly and easily removed from the clutch housing without disassembling or disturbing the transmission gears, the propeller shaft, or the bearings for the clutch shaft.

Other objects and desirable features of my invention will be hereinafter pointed out.

In the accompanying drawings I have illustrated my invention applied to, or embodied in, an automobile, but I wish it to be understood that the invention is applicable to other types and kinds of conveyances or apparatus that comprise a power unit, such as an internal combustion engine, and a variable speed transmission mechanism for transmitting movement from the power unit to a propeller shaft, or equivalent device.

Figure 1 of the drawings is a fragmentary side elevational view of an automobile chassis equipped with a transmission mechanism constructed in accordance with my invention.

Figure 2 is a view, partly in section and partly in side elevation, illustrating the manually operated control device of the gear shifting apparatus.

Figure 3 is an enlarged side elevational view of the gear case showing in vertical section certain of the parts of the gear shifting apparatus.

Figure 4 is a detailed sectional view of the flexible shaft employed to transmit movement from the control device of the gear shifting apparatus to the element that actuates the shifting forks associated with the gears.

Figure 6 is a fragmentary side elevational view, partly broken away, of a mechanism that co-acts with the actuating device of the dual drive to impart movement to the shifting fork of same, said view being taken on the line 6—6 of Figure 7.

Figure 7 is a transverse sectional view taken on the line 7—7 of Figure 6.

Figure 8 is a transverse sectional view taken on the line 8—8 of Figure 6.

Figure 9 is a sectional view similar to Figure 6, showing the parts in a different position.

Figure 10 is a vertical longitudinal sectional view on an enlarged scale, of the dual drive unit.

Figure 11 is a fragmentary sectional view of the dual drive unit, illustrating how the clutch shaft is manipulated in the operation of removing the friction elements of the clutch and the fly wheel of the engine.

Figure 12 is a vertical transverse sectional view taken on the line 12—12 of Figure 10.

Figure 13 illustrates the tool that is used to withdraw the clutch shaft from engagement with the friction elements of the clutch.

Figure 14 is a vertical transverse sectional view taken on the line 14—14 of Figure 10.

Figure 15 is a transverse sectional view of the gear shifting apparatus taken on the line 15—15 of Figure 3.

Figure 16:
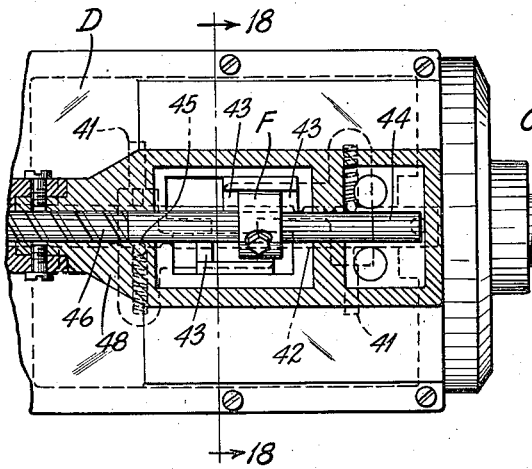
Figures 16 and 17 are views similar to the right hand portion of Figure 3, illustrating the actuating element for the forks of the gear set in two different positions.
Figure 17:
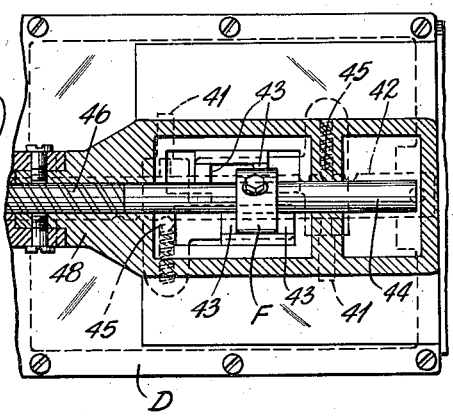

In Figure 1 of the accompanying drawings, the reference character A designates, as an entirety, the internal combustion engine of an automobile, B designates the side members of the chassis frame, and C designates the propeller shaft which extends rearwardly to the differential associated with the rear axle assembly, not shown. The means that is used to transmit movement from the crank shaft of the engine to the propeller shaft C consists of a transmission mechanism which is constructed in such a way as: (a) to permit the propeller shaft C to be arranged in a substantially horizontal position in the same horizontal plane, or within the vertical depth, of the side members B of the chassis frame on which the body of the automobile is mounted; (b) to provide a dual drive comprising different sets of gears, either of which the operator in charge of the vehicle may select at will to obtain a high, economy drive or a low, power drive; (c) to eliminate the conventional gear shift lever in the driver's compartment which projects upwardly from the floor; and (d) to facilitate the removal of the friction elements of the clutch, and, if desired, the fly wheel of the engine, without disturbing the gears, the propeller shaft, or the bearings for the clutch shaft.

Said transmission mechanism is herein illustrated as consisting of or comprising a set of gears, hereinafter referred to for convenience as a gear set, similar in general design and arrangement to the standard three speed and reverse gear sets now generally used on automobiles, and a dual drive unit arranged in advance of said gear set and constructed so as to permit the propeller shaft C to be arranged in a lower horizontal plane than the crank shaft of the engine A. Preferably, the gear set and dual drive unit above referred to, are mounted in the same case or housing, but I wish it to be understood that they may be mounted in separate and distinct casings or housings without departing from the spirit of my invention. In the drawings, the reference character D is used to designate the case or housing just referred to. As shown in Figure 1, said case D is mounted within the vertical limits of horizontally disposed portions of the side members B of the chassis frame on which the body of the automobile is mounted, there being no portion of said case D that projects downwardly below the side members B. Also, as shown in Figure 1, the engine A is mounted on the chassis frame in such a way that no portion of the fly wheel and clutch housing A¹ projects downwardly below the side members of the chassis frame. In other words, my invention makes it possible to build an automobile in which the side members of the chassis frame are dropped considerably lower than is conventional practice, and within which the gear case is confined, thereby permitting the engine, in effect, to be raised so that, notwithstanding the fact that there is ample clearance under the fly wheel housing, there is no portion of said housing which projects downwardly below the chassis frame. In order to facilitate the operation of the gears of the transmission mechanism and increase the leg room and foot clearance in the driver's compartment, I have eliminated the usual gear shifting lever and substituted for same a manually operated control element preferably mounted on the instrument panel of the body and combined with a flexible shaft, having an oscillating and rectilinear movement, that leads to a fork actuating element that operates in an H-shaped slot in the side of the gear case.

*Dual drive*

In Figure 10 the dual drive unit is illustrated as comprising two horizontally disposed shafts 1 and 2, arranged one above the other, the top shaft 1 being arranged in the same horizontal plane as the crank shaft of the engine A and being provided with two gears 3 and 4, each having a different number of teeth, that are at all times enmeshed with two gears 3a and 4a, that are rotatably mounted on the bottom shaft 2. At the rear end of the bottom shaft 2 is a gear 2a that is in constant mesh with one of the gears of a gear set comprising gears that can be arranged in certain relationships so as to produce three forward speeds and a reverse, said gear set being arranged between the dual drive unit and the propeller shaft C of the automobile, and the bottom shaft 2 being arranged in the same horizontal plane as said gear set. The top shaft 1 of the dual drive unit is driven directly from the crank shaft of the engine by the clutch shaft 5, and hence operates at the same speed of rotation as the engine crank shaft. A coupling device is provided for enabling either one or the other of the gears 3a or 4a to be coupled with the bottom shaft 2 of the dual drive unit that actuates the set of change speed gears at the rear of the dual drive unit. Various types or kinds of coupling devices may be used for this purpose, but in the form of my invention herein illustrated, the means used for this purpose consists of a manually shiftable clutch element 6 splined to the bottom shaft 2, and provided with two toothed clutch elements 3b and 4b, respectively, that are adapted to co-act with toothed clutch elements 3c and 4c, that project laterally from the inside faces of the gears 3a and 4a. When the clutch element 6 is arranged in its left hand position shown in Figure 10, the bottom shaft 2 of the dual drive is coupled up with the top shaft 1 and hence, will produce a certain speed ratio between the engine crank shaft and the main driving gear 2a of the gear set behind the dual drive, and when the clutch element 6 is shifted to the right so as to cause the clutch element 4b thereon to mesh with the clutch element 4c on the gear 4a, a different speed ratio will be produced between the engine crank shaft and the driving gear 2a of the gear set. Usually the gears 4 and 4a will be designed so as to produce about a 2 to 1 ratio, and the gears 3 and 3a, will be designed so as to produce about a 1.40 to 1 ratio for a higher, economy drive, but, if desired, the gears 3 and 3a may be designed so as to produce about a 2.60 to 1 ratio for a lower, power drive. From the foregoing it will be understood that in my improved mechanism the bottom shaft 2 of the dual drive, and the propeller shaft C, always operate at a slower speed than the engine crank shaft.

This is desirable in that it improves gear shifting and synchronizing, it produces quieter and smoother operation, and it reduces wear on bearings and all rotating parts.

Figure 5:
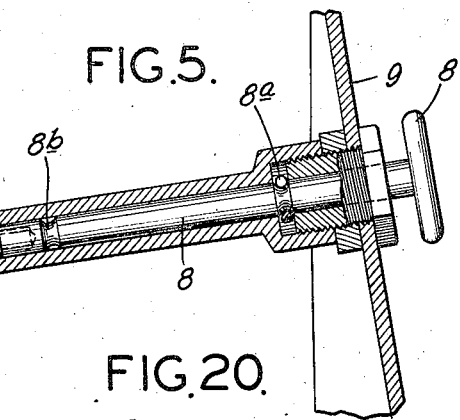
Figure 5 (sheet 4) is a detailed sectional view of the actuating device for the dual drive unit that the operator in charge of the automobile manipulates when he desires to change from one drive to the other.

For reasons hereinafter explained in describing the synchronizing device, the shiftable coupling element 6 is splined to, and shiftably mounted on, a sleeve 7, which in turn is splined to, and shiftably mounted on, the bottom shaft 2. Various means may be used to shift the coupling element 6 so as to change from one drive to the other, namely, to cause the shaft 2 to be coupled with the gear 3a or with the gear 4a, but the means that I prefer to use to control or govern the position of the coupling element 6 consists of a manually operated plunger 8, mounted preferably on the instrument panel 9 of the automobile body as shown in Figures 2 and 5, and combined with a Bowdin wire or similar apparatus comprising a stationary outer casing 10, inside of which is reciprocatingly mounted a relatively stiff wire 11, which has one of its ends connected to the plunger 8 and has its opposite end connected to an arm 12 on a rock shaft 13 mounted in a suitable bearing on the gear case D. Said rock shaft 13 is provided with a segmental gear 14 that meshes with a rack bar 15 as shown in Figures 6, 7 and 9, with the result that when the shaft 13 is rocked, due to movement of the plunger 8, the rack bar 15 will move end-wise and thus change the position of a shifting fork 16, which projects laterally from the rack bar 15 and is arranged in engagement with the shiftable clutch element 6, as shown in Figure 8. Normally, the rack bar 15 is held at the end of its stroke in one direction, by means of an expansion spring 17, whereby the shiftable clutch element 6 will be normally maintained in the position shown in Figure 10, so as to couple the clutch element 3b with the clutch element 3c and thus cause the bottom shaft 2 to revolve with the top shaft 1 that is driven by the clutch shaft 5. If the operator in charge of the automobile desires to shift to the other drive, it is only necessary to pull the plunger 8 outwardly so as to rock the shaft 13 in the direction to shift the rack bar 15 end-wise into the position shown in Figure 9, and thus cause the clutch element 4b to be engaged with the clutch element 4c, whereupon the speed ratio will change due to the fact that the shaft 2 is now being driven by the gears 4 and 4a whose ratio is different from the gears 3 and 3a that were functioning prior to pulling the plunger 8 outwardly. In order to hold the plunger 8 in the position into which it was moved, the housing in which said plunger is reciprocatingly mounted is provided with a locking device 8a (see Figure 5) that snaps into an annular groove 8b in the plunger, and holds it against accidental movement. As soon as the plunger 8 is released from the locking means or holding means just described, said plunger and the rack bar 15 associated with same are restored automatically to their normal positions by the force of the spring 17 which was placed under compression when the plunger 8 was pulled outwardly.

A dual drive unit of the kind above described greatly improves the operation of an automobile, and when used in conjunction with or in advance of a transmission mechanism having three forward speeds and one reverse, it produces an eight speed transmission comprising two highs, two seconds, two first and two reverse speeds with the speed ratio depending on the preselected drive. Other advantages of said dual drive unit are that it makes it possible to equip an automobile with an auxiliary drive, comprising three forward speeds and one reverse speed that can be used for heavy duty work, for example, pulling a trailer, and which can be rendered operative simply by manipulating a device (the plunger 8) which is under direct control of the operator at all times; it provides a convenient and inexpensive way to drop the propeller shaft or to arrange said shaft in such a position that it is unnecessary to form a propeller shaft tunnel in the floor of the body, even of a very low hung body, and it permits the gears used to produce a certain speed ratio between the engine crank shaft and the drive shafts of the rear wheels to be divided or arranged so that some of the gears are located at the rear end of the propeller shaft, and the remaining gears are located at the front end of the propeller shaft. The particular details of construction of the dual drive unit above described are not essential, and may be varied to suit existing conditions. While I have herein shown said unit as being built into a case or housing that also contains a set of change speed gears, I wish it to be understood that said dual drive unit may be constructed in the form of a separate device that is used as an adjunct to a conventional gear set and housed in a case that is separate and distinct from the case of the gear set.

As previously stated, one desirable feature of my improved transmission mechanism is that the friction elements 18 of the clutch and, if desired, the fly wheel of the engine, may be easily removed without disturbing the gears, the propeller shaft, or the bearings 19 for the driving shaft 1 of the dual drive unit. In order to attain this result, I make the top shaft 1 of the dual drive unit hollow, and combine the clutch shaft 5 with the same in such a way that said clutch is splined to the shaft 1, but is capable of being moved end-wise relatively to said shaft 1 so as to withdraw the clutch shaft from the friction elements 18 of the clutch, and permit said friction elements and, if desired, the fly wheel of the engine, to be removed through a removable bottom portion $A^2$ at the bottom of the fly wheel housing, as shown in Figures 10 and 11. The clutch shaft 5 is provided with splines 21 that fit in splineways on the interior of the hollow top shaft 1 of the dual drive unit, and said clutch shaft 5 is provided at one end with an internally screw-threaded hole 22 that is adapted to receive an externally threaded tool 23, shown in Figure 13, when it is desired to withdraw the clutch shaft from the friction elements of the clutch. Normally, the clutch shaft 5 occupies the position shown in Figure 10, said shaft being held in this position by the conjoint action of a snap ring 24 on the interior of the hollow shaft 1 that bears against a shoulder 25 on the clutch shaft and thus limits end-wise movement of said shaft in one direction, and a spacing device 26, interposed between the right hand end of the clutch shaft and a removable oil sealing plug 27 that is threaded into the right hand end of the hollow shaft 1, and locked by the locking ring 28. If it is desired to remove the friction elements of the clutch and, if desired, the fly wheel of the engine, a closure 30 is first removed from a hole in the case D arranged in longitudinal alignment with the central bore of the hollow top shaft 1, as shown in Figure 11. After the lock ring 28 and seal plug 27 have been removed from the right hand end of the shaft 1, the tool 23 is threaded into the hole 22 in the end of the clutch shaft, after which said tool 23 is pulled to the right so as to move the clutch shaft endwise into the position shown in Figure 11. The removable cover plate A² at the bottom of the fly wheel and clutch housing is then taken off, and after the support 29 for the clutch throwout bearing has been removed from the part that carries the same, as shown in Figure 11, the friction elements of the clutch, and the fly wheel, may be dropped downwardly and removed through the opening at the lower end of the clutch housing. In a construction of the kind above described, the front end of the clutch shaft 5 is supported by a front bearing 31 (see Figure 10) and the rear end of said clutch shaft is supported by the hollow shaft 1, in which the clutch shaft is telescopically mounted in such a way that it can be withdrawn from the friction elements 18 of the clutch without disturbing the rear bearing or supporting means for the clutch shaft, and without disturbing the gears or the propeller shaft of the apparatus. To state it in another way, my improved dual drive unit contemplates using a shaft 1, driven directly by the engine, and mounted in suitable bearings in the case or housing of the unit, plus an extensible section (the clutch shaft 5) combined with said shaft 1 in such a way that it normally serves as a support for the friction elements of the clutch but is capable of being retracted or moved inwardly into the hollow shaft 1 when it becomes necessary or desirable to dismount the friction elements of the clutch or, if desired, the fly wheel also.

Synchronizing device

The dual drive unit above described is equipped with a novel synchronizing device that operates on the principle of hydraulic resistance and which is an improvement upon conventional synchronizing devices of the kind now in general use in that it is less expensive to manufacture, it is very compact, it is not affected by changes in temperature, and it does not require a special type or kind of oil to lubricate the gears. It may be described generally as comprising a rotor connected to a rotating shaft so as to revolve with the same, a gear on said shaft splined or connected to the same in any way that will cause the gear to revolve with said shaft, a second gear loosely mounted on said shaft and adapted to be meshed with the gear first mentioned, either for the purpose of causing the loose gear to be driven by the splined gear on the shaft, or for causing the splined gear to drive the loose gear, a set of vanes or blades on the rotor, and a cooperating set of vanes or blades on the loose gear arranged in the same vertical plane but in such a way that the rotor can turn inside of the loose gear, or the loose gear can turn around the rotor without causing said vanes to clash or touch each other, and a shiftable sealing device constructed or arranged so that when the co-acting gears are being meshed or moved into engagement with each other, oil or an equivalent liquid will be trapped between the vanes on the rotor and the vanes on the loose gear in such a way that said rotor and loose gear will be brought to the same speed of rotation by the time the teeth on said gears start to mesh or engage each other. Said synchronizing device is employed for the purpose of synchronizing the clutch elements 3b and 4b on the coupling element 6 of the dual drive, with the clutch elements 3c and 4c carried by the constantly rotating gears 3a and 4a, and, consequently, said synchronizing device is equipped with two rotors and two sealing devices, but I wish it to be understood that my invention is not limited to a transmission mechanism composed of parts of the exact kind and arrangement herein illustrated. As shown in Figure 10, the bottom shaft 2 on which the gears 3a and 4a are loosely mounted, is provided with two rotors 3d and 4d, that are splined to the shaft 2 and arranged so that the laterally projecting clutch element 3c on the inner side of the loose gear 3a surrounds the rotor 3d, and the laterally projecting clutch element 4c on the inner side of the loose gear 4a surrounds the rotor 4d. Said rotors are of the same construction, and each rotor is provided with one or more sets of outwardly projecting blades or vanes 32 that cooperate with inwardly projecting blades or vanes 33 on an annular portion of the loose clutch element that surrounds the rotor. In the form of my invention herein illustrated, each rotor is provided with two sets of vanes or blades arranged in spaced relationship with oil pockets 34 between said sets that serve, in effect, as supply and relief chambers for the oil that circulates between the vanes on the rotor and its co-acting loose gear, and which is adapted to be trapped in the space between the vanes so as to form, in effect, an hydraulic ram that causes the two clutch elements to be brought to the same speed before they are engaged with each other.

The sleeve 7, previously referred to, that is shiftably mounted on the shaft 2 and which in turn carries the shiftable coupling element 6, has connected to the opposite ends of same two disc shaped sealing plates, one of which, namely, the plate 3e, is adapted to be moved into a seat 3f, formed in an annular portion of the clutch element 3c during the operation of meshing the clutch elements 3b and 3c, thereby trapping the oil in the spaces between the vanes on the gear 3a and rotor, and the other sealing plate 4e being adapted to be moved into a similar seat 4f, formed in an annular portion of the clutch element 4c, for a similar purpose, during the operation of moving the clutch element 4b into engagement with the clutch element 4c. In order to provide sufficient time for the driven member, namely the clutch element 3b or 4b, to be brought up to the same speed as the driving member, namely the clutch element 3c or 4c, during the operation of meshing said clutch elements, the coupling element 6 is mounted on its supporting sleeve 7 in such a way that when said coupling element 6 starts to move due to the pressure exerted upon same by the shifting fork 16, the sleeve 7 will also start to move end-wise in the same direction, thereby causing one of the sealing plates on said sleeve to move into the seat provided for the same in the annular portion of the toothed clutch element with which it co-acts. After said sealing plate has been forced home, namely, forced into its seat, the sleeve 7 will, of course, come to rest, but the coupling element 6 will continue to move in the same direction, thereby causing one of the toothed clutch elements on the coupling element 6 to be meshed with the loose toothed clutch element with which it cooperates. This time lag or interval after the seating of the sealing device is effected, is provided so as to insure that the two toothed clutch elements will be brought up to the same speed of rotation by the time the splined toothed clutch element on the coupling element 6 moves into engagement with its co-acting loose toothed clutch element. Any suitable means may be used to cause the sleeve 7 to start to move with the coupling element 6, and then come to rest without interfering with the continued movement of said coupling element, but the means I have herein illustrated consists of a snap ring 36 on the interior of the coupling element 6 that is adapted to engage either one of a pair of annular grooves 37 formed in the external edges of the splines on the sleeve 7 on which the coupling element 6 slides. Assuming that the parts of the dual drive are in the position shown in Figure 10 and that the operator in charge of the vehicle pulls the control plunger 8 outwardly, the shifting fork 16 will move in the direction to move the coupling element 6 to the right, thereby causing the sealing plate 4e to move into the seal provided for same in the toothed clutch element 4c, after which the continued pressure to the right on the coupling element 6 will cause the snap ring 35 to spring out of the groove 37 in which it is positioned, thereby releasing the coupling element 6 and permitting it to move to the right far enough to engage the toothed clutch element 4b with the toothed clutch element 4c. After said clutch elements have been engaged, the snap ring 35 springs into the other groove in the sleeve 7 and, consequently, when the control plunger 8 is restored to its former position, the coupling element 6 will move laterally to the left so as to first synchronize the two toothed clutch elements 3b and 3c, and then mesh said elements with each other. Obviously, any other means than a snap ring and co-acting annular groove might be used to frictionally connect the coupling element 6 with its supporting sleeve 7 and effect the above described operation of sealing the oil in the space between the vanes preparatory to meshing the toothed clutch elements with each other.

In conventional transmission design, the main shaft is in alignment with the clutch shaft and carries the synchronizing gears and the counter-shaft is arranged directly below the main shaft and submerged in oil. In my improved mechanism the main shaft is at the bottom of the housing and submerged in oil which is supplied to the rotor when the sealing plate is in its open or inactive position, and the counter-shaft (the top shaft 1) is arranged above with provision for sliding the clutch shaft inside of said counter-shaft. Suitable oil seals, not shown, are provided for the front end of the shaft and for the point where the propeller shaft C joins the gear set so as to permit any desired oil level to be maintained in the case D. As the drawings show, the transmission proper is in alignment with the lower main shaft with the counter-shaft positioned in the same horizontal plane. The above design allows the housing or case to be made substantially flat and of such dimensions that it may be mounted within the depth of a normal sized chassis frame which is highly desirable in that it allows full road clearance to the bottom of the frame, and a minimum clearance of the floor above the frame.

In my improved unit the synchronizing rotor, or rotors, has a free rolling mechanical fit inside the annular clutch element on the loose gear, and the loose gear has a free rolling fit on the main shaft 2 when the coacting toothed clutch elements are not engaged. When the rotor is in motion there is a continually variable space between the vanes of the rotor and the vanes of the loose clutch element, which feature is desirable in that it tends to increase the oil resistance. The two chambers 34 that are formed in the rotor function as a supply chamber and relief chamber when the device is in operation. In order to eliminate the possibility of the sealing plate failing to unseat due to creation of a vacuum in the oil space between the sealing plate and its co-acting part, I provide the coupling element 6 with vent holes 38 disposed so that when one or the other of the sealing plates is in its active or operative position, one set of vent holes 38 will be in alignment with the outer edge of the tapered seat in which the sealing plate is seated and, consequently, the slightest movement imported to the sealing plate to unseat the same will cause air to be supplied to the oil space containing the vanes, and thus break any vacuum that might exist in the same. There are practically no wearing parts in a synchronizing device of the construction above described, and it may be operated successfully with any grade of oil suitable for gear operation due to the fact that the device is of such design and construction that the resistance increases as the oil becomes heavier. Conventional types of synchronizing devices are objectionable in that they require a special light oil and as the oil becomes heavier, due to weather conditions, they do not operate perfectly satisfactorily until after the automobile has been in operation for a sufficient length of time to warm up the oil. My improved synchronizing device has not this objectionable characteristic and, as previously stated, it is not affected by changes in temperature and does not require any special type or kind of oil for its successful operation.

*Gear shifting apparatus*

Figure 18:
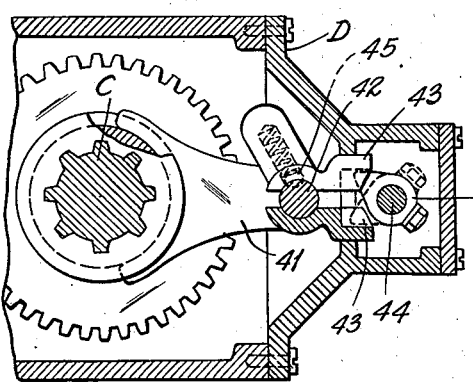
Figure 18 is a transverse sectional view taken on the line 18—18 of Figure 16.
Figure 19:
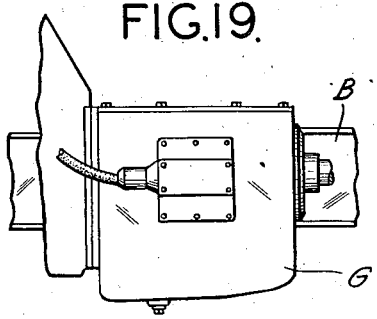
Figure 19 is a side elevational view, illustrating a construction wherein a gear set of substantially conventional design is housed in a case that is separate and distinct from the case of the dual drive unit.

The gears of the gear set at the rear of the dual drive unit are controlled by a shifting apparatus that departs from standard practice in that the actuating device for the shifting forks is arranged in an H-shaped slot formed at the side of the gear case, and the manually operated control element is mounted on the instrument panel or some portion of the automobile body other than the floor of the driver's compartment. Figures 1 and 2 of the drawings illustrate the control element E as being mounted on the instrument panel 9, and constructed in the form of a bent rod or handle mounted in a stationary supporting bearing 40 in such a way that it can be oscillated to the right or to the left and also moved end-wise either forwardly or rearwardly. It is arranged preferably at the right of the steering wheel as shown in Figure 1 and so designed that it is intended to be moved in the same directions as the conventional gear shifting lever now in general use. For example, the control element E is rocked laterally to the left and moved forwardly to arrange it in "reverse", it is rocked laterally to the left, and moved rearwardly to arrange it in "low", it is moved forwardly from "low" though "neutral", then rocked laterally to the right and moved forwardly into "second", and it is then moved directly rearwardly to arrange it in "high". A flexible shaft of any suitable type or kind is used for transmitting movement from the control element E to a device F that is used to actuate the shifting forks 41 of the gear set, said shifting forks 41 being slidably mounted on a stationary horizontally disposed shaft 42 in the gear case and said forks being provided with portions 43 that are adapted to be engaged by the device F. The device F is rockable and longitudinally shiftable, and it is arranged at the side of the gear case in such a way that it will operate in a conventional H-shaped slot as shown in Figures 15 and 18. The actuating device F consists of a part of any suitable shape or form that is rigidly attached to a shaft 44 that is moved by the flexible shaft previously mentioned which leads from the control element E. When the control element E is moved forwardly the shaft 44 moves end-wise in one direction, when the control element E is moved rearwardly the shaft 44 moves end-wise in the opposite direction, and when the control element E is rocked to the right or to the left, the shaft 44 will rock either in clockwise direction or anti-clockwise direction, depending upon the direction of oscillation or rocking of the control element E. In the apparatus herein illustrated, the shaft 44 is mounted in a suitable bearing portion on the gear set case in such a way that it is capable of rocking and also moving end-wise, and is provided with a cam, lever or other suitable part F, positioned so that when the control element E is rocked, the device F will rock and move into engagement with the portion 43 on one of the shifting forks and thereafter, when the control element E is moved end-wise, the device F, by cooperating with the part 43 on the fork, will shift the fork laterally on its supporting shaft 42 and thus effect a change in the position of the gear governed by that particular fork. As shown in the drawings, the gear set comprises two shifting forks that are slidingly mounted on the supporting shaft 42 and provided with position locks formed preferably by spring pressed plungers 45 on the forks that are adapted to engage notches in the supporting shaft 42, said shaft having two sets of notches, each comprising three notches, arranged so that each shifting fork will have a neutral position and two active or operative positions. The particular design or details of construction of that portion of the gear set which is relied upon to shift the gears is immaterial so long as the gear shifting means is of such a character or nature that it comprises portions at the side of the gear case that can be engaged with and moved by an actuating device (part F) that is capable of being rocked or oscillated and also moved end-wise so as to impart movement to a part of the gear set which shifts or changes the position of one of the gears. As previously stated, the control element E on the instrument panel is connected by a flexible shaft with the rockable and reciprocating shaft 44 that carries the actuating device F. Preferably, the flexible shaft just referred to is formed by a spirally wound metal ribbon 46 that is positioned inside of a flexible metal housing 47 whose upper end is attached in any suitable way to the bearing 40 that carries the control element E, and whose lower end is connected in any suitable way to the bearing portion 48 on the side of the gear case in which the shaft 44 is mounted. I prefer to use a flexible shaft constructed from a spirally wound ribbon of metal due to the fact that such a shaft has sufficient stiffness to impart an end-wise thrust or pull to the shaft 44 and also sufficient stiffness to rock or oscillate said shaft. However, any other suitable type or kind of flexible shaft that will cause the shaft 44 to rock with the control element E and also move end-wise with said control element might be used in place of the flexible shaft herein shown. When a flexible shaft of the ribbon type is used the end portion of the control element E and the end portion of the shaft 44 are preferably provided with spiral splines onto which the spirally wound ribbon, constituting the shaft, may be screwed and then locked in position by a terminal portion 46a on the ribbon (see Figure 4) that snaps into a hole in the part to which the ribbon is to be connected. The bearing 40 in which the control element E is mounted is preferably provided with an oil cup or any other suitable kind of lubricating device 40a for supplying a lubricant to the shaft, and the casing 47 is preferably surrounded by a dust-tight and oil-proof shield 49 formed of rubber or any other suitable material. While I prefer to mount the dual drive and the gear set in the same case or housing, the gear set may be arranged in a separate case or housing designated by the reference character G in Figure 19.

Figure 20:
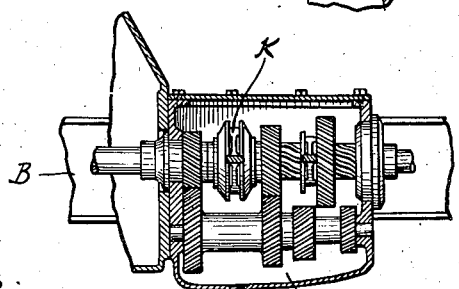
Figure 20 is a vertical longitudinal sectional view of the gear set shown in Figure 19.

In Figure 20, I have shown more or less diagrammatically, how my improved synchronizing means may be applied to a conventional gear set, the reference character K in Figure 20, designating as an entirety a synchronizing device comprising a rotor, a sealing plate and cooperating vanes on the rotor and on a gear provided with a recess in which the rotor is positioned, all as previously explained in the discussion of the dual drive unit.

Having thus described my invention, what I claim as new and desire to secure by Letters Patent is:

1. A transmission mechanism for automobiles and the like, comprising a case, a hollow top shaft in said case driven from the power unit of the automobile, bearings in the case for said top shaft, an extensible portion on said shaft adapted to be used to carry the friction elements of a clutch and constructed so as to be capable of being withdrawn from said friction elements and moved into said hollow shaft without disturbing said shaft bearings, a bottom shaft mounted in said case below said top shaft, and means for driving said bottom shaft from said top shaft.

2. A transmission mechanism for automobiles and the like, comprising a case, a hollow top shaft in said case driven from the power unit of the automobile, bearings in the case for said top shaft, an extensible portion on said shaft adapted to be used to carry the friction elements of a clutch and constructed so as to be capable of being withdrawn from said friction elements and moved into said hollow shaft to facilitate the removal of said friction elements, a bottom shaft arranged below said top shaft and adapted to be used to drive a gear set of the change speed type, a plurality of loose gears on said bottom shaft arranged in constant mesh with a plurality of gears that are fixed to said top shaft, and means for enabling said bottom shaft to be coupled with a selected one of said loose gears.

FRANK D. FRISBY.